Nov. 8, 1949  J. E. GOODWILLIE ET AL  2,487,702
MOTOR DRIVE FOR PAPER MAKING MACHINE
Filed March 2, 1946
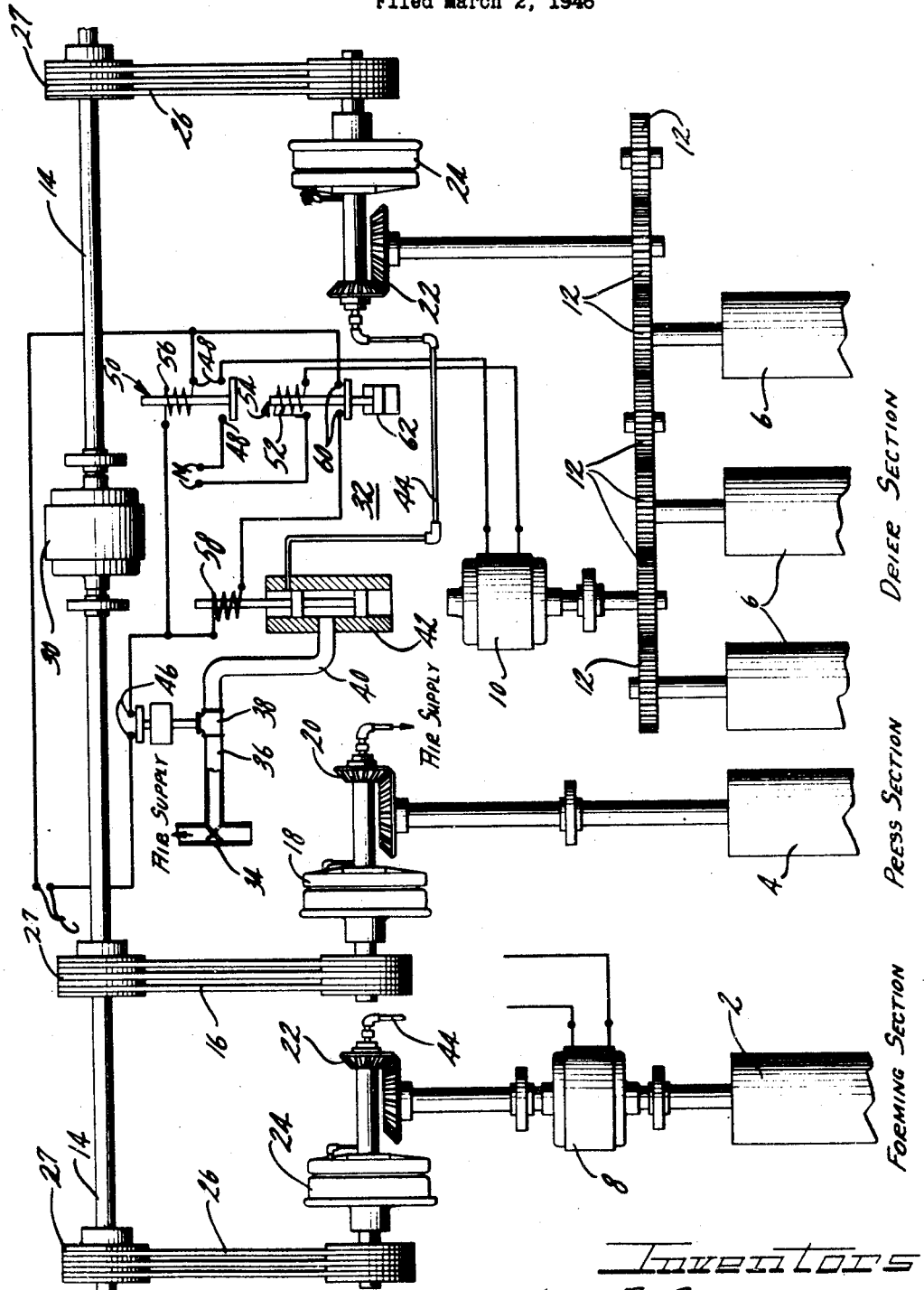
Inventors
JOHN E. GOODWILLIE
EDWARD D. BEACHLER
By The Firm of Charles W. Hills  Attys.

Patented Nov. 8, 1949

2,487,702

UNITED STATES PATENT OFFICE 2,487,702

MOTOR DRIVE FOR PAPERMAKING MACHINES

John E. Goodwillie and Edward D. Beachler, Beloit, Wis., assignors to Beloit Iron Works, Beloit, Wis., a corporation of Wisconsin Application March 2, 1946, Serial No. 651,653

9 Claims. (Cl. 192—.02)

This invention relates to a motor drive for paper making machines or the like, and particularly to an improved control arrangement governing the operation of a clutch arranged to effect the coupling of two independently rotating mechanisms.

In many industrial machines, and particularly in paper making machines, there is often found a plurality of sections of rotating mechanisms, each section being driven by a separate electric motor. For the proper operation of the entire machine it is necessary that the speed of rotation of the various sections be exactly correlated and this may be conveniently done by coupling each of the sections to a common rotating mechanism such as a shaft which may or may not be driven by an electric motor. For example, in paper making machines the various rotating mechanism sections requiring a large amount of power to drive, such as the forming section and the drier section, are each driven by separate motors which are respectively directly geared to the sections. To effect the necessary high degree of speed correlation, a tie-in shaft is provided which may or may not be motor driven. Each of the independently driven heavy sections are then coupled to the tie-in shaft by the operation of suitable clutches.

With the foregoing arrangement for mechanically effecting speed correlation of independently driven rotating mechanisms, it is of extreme importance that each of the independently driven rotating mechanisms be coupled to the tie-in shaft only when such driven rotating mechanism has been brought up to its normal speed by its driving motor. If coupling is effected between any one of the heavy driven rotating mechanisms with the tie-in shaft prior to the driven mechanism being brought up to speed by its own drive motor, then an excessive and injurious overload would be applied to the driving motor of the tie-in shaft or, in the event that no such motor is provided for the tie-in shaft, then an excessive over-load would be produced on the driving motor of the other rotating mechanisms which have been previously coupled to the tie-in shaft. Likewise, dangerous overloading of the other motors may be produced in the event of power or mechanical failure of the driving motor for any one of the heavy, driven rotating mechanisms.

It is a feature of this invention that the clutch effecting the coupling between any one of the heavy independently driven rotating mechanisms and the tie-in shaft is electrically controlled to be responsive to the energization of the driving motor for the respective rotating mechanism. In accordance with this invention, the clutch cannot effect coupling of an independently driven rotating mechanism with the tie-in shaft unless the driving motor for the driven rotating mechanism is energized.

A further feature of this invention is the provision of a solenoid controlled clutch to effect the coupling between an independently driven rotating mechanism and a tie-in shaft, arranged so that the solenoid controlled clutch effects the coupling only in response to energization of the driving motor for the driven rotating mechanism; furthermore, the response of the solenoid controlled clutch is delayed to insure that the driving motor has achieved substantially its normal speed before the coupling is effected. A further feature of this invention lies in the fact that the aforedescribed arrangement will also function to immediately uncouple a driven rotating mechanism from a tie-in shaft upon the failure of current supplied to the driving motor of the driven rotating mechanism.

Accordingly, it is an object of this invention to provide an improved control arrangement for coupling a motor driven rotating mechanism with a second rotating mechanism.

Another object of this invention is to provide an improved motor drive for paper making machines characterized by a coupling control arrangement operable between various independently motor driven sections of the machine to effect a mechanical coupling of all the independently driven rotating sections of the machine without danger of overloading any one of the driving motors.

A particular object of this invention is to provide a coupling control arrangement operable to couple a heavy rotating driven mechanism with a tie-in shaft, characterized by the fact that the coupling operation may be accomplished only after the driving motor for the heavy driven rotating mechanism has been energized and achieves substantially full speed.

A particular object of this invention is to provide an improved control circuit for a solenoid controlled clutch operable to couple a motor driven rotating section of a paper making machine to a tie-in shaft wherein the solenoid controlled clutch is actuated to accomplish the coupling only in response to the energization of the driving motor of the driven rotating section.

The specific nature of this invention as well as other objects and the advantages thereof will be apparent to those skilled in the art from the following detailed description of the annexed sheet of drawings which, by way of preferred example, illustrates one embodiment of the invention.

On the drawings, the single figure represents schematic diagram of a motor drive for a paper making machine constructed in accordance with this invention.

As shown on the drawings:

Referring to the drawings there are shown in schematic arrangement the various sections of a paper making machine, such for example as the forming section including a rotating couch roll 2, a press section including a press roll 4, and a drier section including a plurality of successive drying rolls 6. The forming section and the drier section, as will be understood to those skilled in the art, requires considerable driving energy and hence constitute so-called "heavy" sections of the machine. Accordingly the forming section is directly driven by an electric motor 8, and the drier section is directly driven by electric motor 10 and the various drying rolls 6 thereof are interconnected to the motor 10 by gears 12. The press section requires substantially less energy to drive and accordingly the roll 4 of the press section may be driven from the tie-in shaft 14 through the medium of belt drive 16, air clutch 18 and bevel gears 20.

The tie-in shaft 14 has the additional function of mechanically correlating the speed of each of the sections of the paper making machine. Preferably tie-in shaft 14 is rotated at the proper correlating speed by the directly connected electric motor 30; however, it should be understood that the motor 30 may be eliminated without reduction of the desirable results achieved by this invention.

The driving motor 8 of the forming section may be mechanically coupled to the tie-in shaft 14 through the medium of bevel gears 22, hydraulic clutch 24 and belt drive 26. Belt drive 26 preferably includes a conventional adjustable sheave pulley 27. A similar arrangement of elements are utilized to mechanically couple the drier section to the tie-in shaft 14. Accordingly, the application of fluid pressure to clutches 24 will respectively directly couple the forming section and the drier section to the tie-in shaft 14. The adjustable sheave pulleys 27 permit limited speed adjustment between the various sections to adjust the draw therebetween.

With the construction thus far described it is obvious that serious damage due to overloading may occur if the clutches 24 are permitted to be operated promiscuously. For example, if the tie-in shaft 14 is being driven by motor 30 and clutches 24 are operated to mechanically couple the forming section and the drier section to tie-in shaft 14 prior to energization of the driving motors 8 and 10, respectively, then the entire load of these two heavy sections would be thrown on the relatively light motor 30 and the consequent overloading would result either in burning out the motor 30 or destruction of the belt drive 26. Similar undesirable results would occur in the event of power failure to either of the driving motors 8 or 10 while the entire machine is operating. The load normally carried by the failed motor would be thrown on the remaining motors in the mechanically coupled system and produce dangerous overloading of such motors.

In accordance with this invention the operation of each of the clutches 24 is controlled to prevent the occurrence of the above dangerous conditions. A control mechanism 32 is provided which is identical for each of the clutches 24. Accordingly, only the control mechanism 32 which operates the clutch 24 coupling the drier section to the tie-in shaft 14 will be described in detail.

Clutch 24 may be of the air operated type and air pressure is supplied to air clutch 24 from a suitable air pressure supply source (not shown) through a manual valve 34, pipe 36, pressure controlled electric switch 38, pipe 40, normally closed solenoid valve 42, and pipe 44. The pressure switch 38 is of the normally open variety and the contacts 46 thereof are closed by the operation of manual valve 34 to apply air pressure to the system described. However, air will not be supplied to air clutch 24 to effect the coupling action until solenoid valve 42 is operated to an open position.

A pair of terminals M are provided which are adapted to be connected to a suitable source of power for driving the motor 10. The terminals M are connected to motor 10 through a series circuit including the contacts 48 of motor energization relay 50 and the coil 52 of delayed response relay 54.

A pair of terminals C are also provided which are adapted to be connected to a suitable source of control power. One of the terminals C is directly connected to the contacts 46 of pressure switch 38. The coil 56 of motor energization relay 50 is connected to be energized from terminals C through contacts 46 of pressure switch 38. Likewise, the coil 58 of solenoid valve 42 is connected to be energized from terminals C through the contacts 46 of pressure switch 38 and in addition through the series connected contacts 60 of delayed response relay 54.

Delayed response relay 54 may be any one of several well known types wherein the closing of its contacts 60 occurs a predetermined time after energization of its coil 52. The delayed response effect of relay 54 is however unidirectional, i. e., it occurs only during the closing movement of the relay and the relay opens its contacts immediately upon interruption of current flow through its coil 52. For example, the delayed response characteristic may be obtained by controlling the movement of the contact making member of the relay by a suitable dashpot 62.

As was heretofore stated, an identical control apparatus 32 is provided to control the operation of the air clutch 24 which effects the coupling of the forming section to tie-in shaft 14. The air clutch 18 coupling the press section to the tie-in shaft does not require any automatic control arrangement and may be directly connected to the air supply through a suitable manual control valve (not shown).

*Operation*

Assuming that the motor 30 is energized from a suitable source of power, the tie shaft 14 rotates at the desired correlating speed. To mechanically couple either the heavy forming section or the heavy drier section to the tie shaft 14, the manual control valve 34 is operated to supply air pressure to pressure switch 38. The closing of the contacts 46 of pressure switch 38 energizes motor control relay 50 and closes its contacts 48 to complete a circuit for driving motor 10 to main power terminals M. Accordingly, motor 10 is energized and rapidly accelerates the drier section up to its normal speed.

The flow of motor current through the coil 52 of delayed response relay 54 initiates the contact closing movement of relay 52. However, the closing of contacts 60 of relay 54 is delayed by dashpot 62 for a sufficient time to insure that the drier section has substantially achieved its normal speed. Closing of contacts 60 energizes the coil 58 of solenoid valve 42 and the resulting operation of solenoid valve 42 supplies air pressure to air clutch 24 to effect the coupling of the rotating drier section with the rotating tie-in shaft 14. The forming section may be similarly coupled to tie-in shaft 14 by operation of the respective control arrangement 32 associated therewith. Finally, the air clutch 18 may be operated to couple the press section to the tie-in shaft 14.

In the event of power failure of either of the driving motors 8 or 10, the relay 54 of the respective control circuit 32 will be de-energized and the contacts 60 thereof opened. Such action de-energizes coil 58 of solenoid valve 42 and cuts off air pressure to the air clutch 24, hence uncoupling the section in which the motor failure occurs from the rotating tie-in shaft 14. In the event of failure of air pressure, the pressure controlled switch 38 de-energizes the respective driving motor.

It is therefore apparent that the described arrangement embodying this invention positively eliminates the possibility of overloading any one of the driving motors of the system due to improper coupling between various rotating mechanisms of the system. Furthermore, the aforedescribed control arrangement automatically effects uncoupling of any of the rotating mechanisms in which a power failure occurs in the driving motor.

It will, of course, be understood that various details of construction may be varied through a wide range without departing from the principles of this invention and it is, therefore, not the purpose to limit the patent granted hereon otherwise than necessitated by the scope of the appended claims.

We claim as our invention:

1. In a paper making machine or the like having a plurality of rotating sections and a driving motor for each section, the improvements of a tie-in shaft for correlating the rotational speeds of said sections, means for rotationally connecting said tie-in shaft with each of said rotating sections, said last mentioned means including solenoid controlled clutches connected respectively between said rotating sections and said tie-in shaft, and means for actuating each of said solenoid controlled clutches in response to energization of the respective drive motor, said last mentioned means including relays respectively having normally open contacts in circuit with said clutch solenoids and the windings thereof respectively in circuit with said driving motors.

2. In a paper making machine or the like having a plurality of rotating sections and a driving motor for each section, the improvements of a tie-in shaft for correlating the rotational speeds of said sections, means for rotationally connecting said tie-in shaft with each of said rotating sections, said last mentioned means including solenoid controlled clutches respectively connected between said rotating sections and said tie-in shaft, relay means responsive to energization of each drive motor for energizing the respective solenoid controlled clutch, and means for delaying the response of said relay means until the respective drive motor substantially achieves its normal speed.

3. In a paper making machine or the like having a plurality of rotating sections and a driving motor for each section, the improvement of a tie-in shaft for correlating the rotational speeds of said sections, a plurality of fluid operated clutches arranged to respectively rotationally connect said tie-in shaft with each of said rotating sections, solenoid valves respectively controlling fluid supply to said clutches, a circuit for energizing each of said solenoid valves to operate the respective clutch, including the contacts of a normally open relay, and means for connecting each of said relays in circuit with the respective driving motor, whereby said clutches are respectively operable to couple said tie-in shaft to said rotating sections only when the respective driving motors are energized.

4. In a paper making machine or the like having a plurality of rotating sections and a driving motor for each section, the improvement of a tie-in shaft, means for rotating said tie-in shaft, a plurality of fluid operated clutches arranged to respectively rotationally connect said tie-in shaft with each of said rotating sections, solenoid valves respectively controlling fluid supply to said clutches, a circuit for energizing each of said solenoid valves to operate the respective clutch, including the contacts of a normally open relay, means for connecting each of said relays in circuit with the respective driving motor, and means for delaying the contact closing operation of said relays upon actuation of said relays in response to energization of the respective driving motor, whereby said clutches are respectively operable to couple said tie-in shaft to said rotating sections only after the respective driving motors have substantially achieved full speed.

5. In a paper making machine having a plurality of rotating sections and a driving motor for each section, the improvement of a tie-in shaft, means for rotating said tie-in shaft, a plurality of fluid operated clutches arranged to respectively rotationally connect said tie-in shaft with each of said rotating sections, solenoid valves respectively controlling fluid supply to said clutches, a circuit for energizing each of said solenoid valves to operate the respective clutch, said circuit including the contacts of a normally open relay, means for connecting each of said relays in circuit with the respective driving motor, means for delaying the contact closing operation of said relays in response to energization of the respective driving motor, whereby said clutches are respectively operable to couple said tie-in shaft to said rotating sections only after the respective driving motors have substantially achieved full speed, and a fluid pressure controlled switch having contacts closing in response to application of pressure to said valves, said last mentioned contacts being connected to simultaneously de-energize said driving motors and said solenoid valves upon a failure of fluid pressure.

6. In combination, a first rotating mechanism, an electric motor for driving said first mechanism, a second rotating mechanism, a solenoid controlled clutch connected between said first and second rotating mechanisms and operable to couple said first and second mechanisms for co-rotation, circuit means for energizing said motor, relay means for operating said solenoid controlled clutch to coupling condition only when said motor is energized, and means for delaying the response of said relay means until said first rotating mechanism has substantially achieved its normal speed.

7. In a paper making machine or the like having a plurality of rotating sections and a driving motor for each section, the improvement of a tie-in shaft, means for rotating said tie-in shaft, a plurality of fluid operated clutches arranged to respectively rotationally connect said tie-in shaft with each of said rotating sections, solenoid valves respectively controlling fluid supply to said clutches, manual control valves respectively controlling fluid supply to said valves, pressure operated electric switches having contacts respectively closing in response to application of pressure to said valves, a first circuit for energizing each of said driving motors including a relay controlled switch closed in response to closing of the contacts of said pressure operated switch and the coil of a delayed response relay, a second circuit for energizing each of said solenoid valves to operate the respective clutch, including the contacts of said pressure operated switch and the contacts of said delayed response relay, whereby said clutches are respectively operable to couple said tie-in shaft to said rotating sections only after the respective driving motors have substantially achieved full speed.

8. In combination, a first rotating mechanism, an electric motor for driving said first mechanism, a second rotating mechanism, a fluid operated clutch arranged to rotationally connect said first and second rotating mechanism, a solenoid valve controlling fluid supply to said clutch, a manual valve for controlling fluid supply to said valve, a pressure operated electric switch operable in response to application of fluid pressure to said valve, circuit means for energizing said motor responsively to operation of said pressure operated electric switch, and circuit means for operating said solenoid valve responsive jointly to operation of said pressure operated electric switch and energization of said motor.

9. In combination, a first rotating mechanism, an electric motor for driving said first mechanism, a second rotating mechanism, a fluid operated clutch arranged to rotationally connect said first and second rotating mechanisms, a solenoid valve controlling fluid supply to said clutch, a manual valve for controlling fluid supply to said valve, a pressure operated electric switch operable in response to application of fluid pressure to said valve, circuit means for energizing said motor responsive to operation of said pressure operated electric switch, relay means for operating said solenoid valve jointly responsive to operation of said pressure operated electric switch and energization of said motor, and means for delaying the response of said relay means until said first rotating mechanism has substantially achieved its normal speed.

JOHN E. GOODWILLIE.
EDWARD D. BEACHLER.

REFERENCES CITED

The following references are of record in the file of this patent:

UNITED STATES PATENTS

| Number | Name | Date |
| --- | --- | --- |
| 1,319,008 | King | Oct. 14, 1919 |
| 1,625,225 | Seeger | Apr. 19, 1927 |
| 1,846,894 | Morgan | Feb. 23, 1932 |
| 1,862,354 | Winne | June 7, 1932 |
| 1,910,606 | Harwood | May 23, 1933 |
| 2,120,714 | Scott | June 14, 1938 |
| 2,202,766 | Trosch | May, 28, 1940 |
| 2,252,762 | Geldhousen | Aug. 19, 1941 |

FOREIGN PATENTS

| Number | Country | Date |
| --- | --- | --- |
| 594,086 | Germany | Mar. 10, 1934 |